United States Patent
Jadhav

(10) Patent No.: US 10,496,125 B1
(45) Date of Patent: Dec. 3, 2019

(54) TWIN PEDAL HYDROSTATIC TRANSMISSION WITH AUTOMATIC THROTTLE

(71) Applicant: Deere & Company, Moline, IL (US)

(72) Inventor: Vikas Jadhav, Pune (IN)

(73) Assignee: DEERE & COMPANY, Moline, IL (US)

( * ) Notice: Subject to any disclaimer, the term of this patent is extended or adjusted under 35 U.S.C. 154(b) by 0 days.

(21) Appl. No.: 16/055,865

(22) Filed: Aug. 6, 2018

(51) Int. Cl.
| | |
|---|---|
| *G05G 1/36* | (2008.04) |
| *G05G 1/46* | (2008.04) |
| *F02D 11/02* | (2006.01) |
| *G05G 11/00* | (2006.01) |
| *F16H 61/437* | (2010.01) |
| *F16C 1/10* | (2006.01) |
| *F16H 61/438* | (2010.01) |
| *B60K 26/02* | (2006.01) |
| *B60K 23/00* | (2006.01) |

(52) U.S. Cl.
CPC ............... *G05G 1/36* (2013.01); *F02D 11/02* (2013.01); *F16C 1/106* (2013.01); *F16H 61/437* (2013.01); *F16H 61/438* (2013.01); *G05G 1/46* (2013.01); *G05G 11/00* (2013.01); *B60K 26/02* (2013.01); *B60K 2023/005* (2013.01); *B60K 2026/026* (2013.01); *B60W 2540/10* (2013.01)

(58) Field of Classification Search
CPC ........... G05G 1/36; G05G 1/46; G05G 1/445; G05G 1/44; G05G 1/30; G05G 11/00; B60K 26/02; B60K 2023/005; B60T 7/04; B60T 7/06; F02D 11/02; F16H 61/437; F16H 61/438
See application file for complete search history.

(56) References Cited

U.S. PATENT DOCUMENTS

| | | | |
|---|---|---|---|
| 2,821,091 A | 1/1958 | Benner | |
| 3,002,397 A | 10/1961 | Du Shane et al. | |
| 3,040,596 A | 6/1962 | Du Shane et al. | |
| 3,535,951 A | 10/1970 | Larson et al. | |
| 3,537,328 A | 11/1970 | Allen | |
| 3,691,863 A * | 9/1972 | Shaffer | B60K 26/00 74/478 |
| 3,939,726 A | 2/1976 | Ahrens | |
| 4,059,025 A * | 11/1977 | Waack | B60K 31/00 74/482 |
| 4,129,047 A * | 12/1978 | Dornan | B60K 23/00 192/98 |
| 4,283,965 A | 8/1981 | Hansen | |
| 4,325,266 A | 4/1982 | Lynch | |
| 5,048,638 A * | 9/1991 | Duncan | B60W 30/18 180/307 |

FOREIGN PATENT DOCUMENTS

WO    WO-2017168471 A1 * 10/2017 ............. B60K 20/02

OTHER PUBLICATIONS

Machine Translation of WO 2017/168471, obtained Aug. 22, 2019.*

* cited by examiner

*Primary Examiner* — Richard W Ridley
*Assistant Examiner* — Brian J McGovern

(57) ABSTRACT

An automatic throttle for a hydrostatic transmission having a forward pedal and a reverse pedal. Each pedal actuates a swash plate on a hydraulic pump for forward and reverse travel. A first bell crank and a second bell crank are connected to the forward pedal and the reverse pedal respectively. Each bell crank may pull a Bowden cable connected to an engine throttle to increase engine speed when either of the pedals is depressed.

8 Claims, 4 Drawing Sheets

TWIN PEDAL HYDROSTATIC TRANSMISSION WITH AUTOMATIC THROTTLE

FIELD OF THE INVENTION

This invention relates to an automatic throttle for a tractor with a twin pedal hydrostatic transmission.

BACKGROUND OF THE INVENTION

Tractors and utility vehicles used for agriculture, lawn care or recreational use may have a hydrostatic transmission that drives a final drive transmission or range transmission of the vehicle. The final drive transmission or range transmission may drive at least one wheel. The vehicle speed may be operator modulated by changing the drive ratio of the hydrostatic transmission, as well as the range gears. The drive ratio may be changed by moving the angle of a swashplate of a variable displacement pump of the hydrostatic transmission.

Hydrostatic transmissions in tractors and utility vehicle may be operated using twin foot pedals to control the direction and speed of the vehicle, and a hand throttle or hand accelerator lever to control the engine speed. This allows operating the tractor at a fixed engine speed required for implements or attachments, while using a first foot pedal to pivot a swash plate in the hydraulic pump to an angular alignment in which hydraulic fluid provided to the hydraulic motors propels the vehicle forward at a desired ground speed, and a second foot pedal to pivot the swash plate to move the vehicle in reverse at a desired ground speed. If neither foot pedal is applied, the swash plate may be in a neutral position.

However, some tractor applications require frequent or continuous use of the hand throttle or hand accelerator lever to change engine speed between low and high engine RPM. For example, tractor applications such as operating a front end loader, driving the tractor at high speeds during road transport, or snow removal may require frequent or continuous changes to engine speed. An automatic throttle for a tractor with a twin pedal hydrostatic transmission offered by Deere & Company includes an electronic controller that provides engine speed commands based on the position of either of the twin throttle pedals. An automatic throttle for a tractor with a twin pedal hydrostatic transmission is needed that is lower in cost than an electronic controller. An automatic throttle for a tractor with a twin pedal hydrostatic transmission is needed that is low cost. An automatic throttle for a tractor with a twin pedal hydrostatic transmission is needed that eliminates frequent or continuous use of a hand throttle or hand accelerator lever to change engine speed.

SUMMARY OF THE INVENTION

An automatic throttle on a hydrostatic transmission having a forward pedal and a reverse pedal. Each pedal actuates a swash plate on a hydraulic pump for forward and reverse travel respectively. A plurality of bell cranks are pivotably mounted to a cross shaft. Linkages are provided between the forward pedal and a first of the plurality of bell cranks, and between the reverse pedal and a second of the plurality of bell cranks. A cable is connected between a third of the plurality of bell cranks and an engine throttle. The third bell crank pulls the cable to the engine throttle in response to depressing the forward pedal or reverse pedal to pivot either of the first or the second bell cranks.

DESCRIPTION OF THE PREFERRED EMBODIMENT

Figure 1:
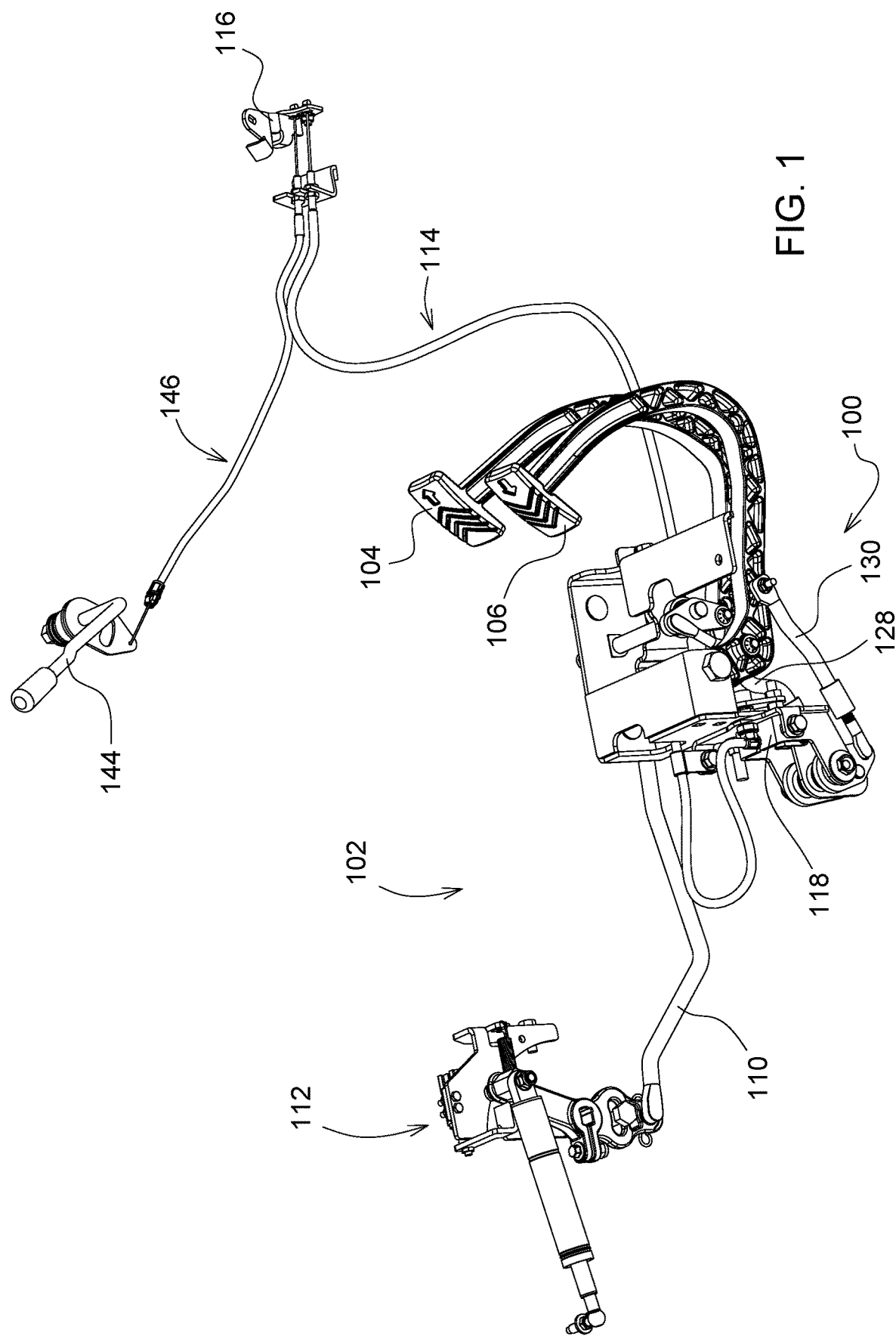
FIG. 1 is a perspective view of a twin pedal hydrostatic transmission with an automatic throttle according to a first embodiment of the invention.
Figure 2:
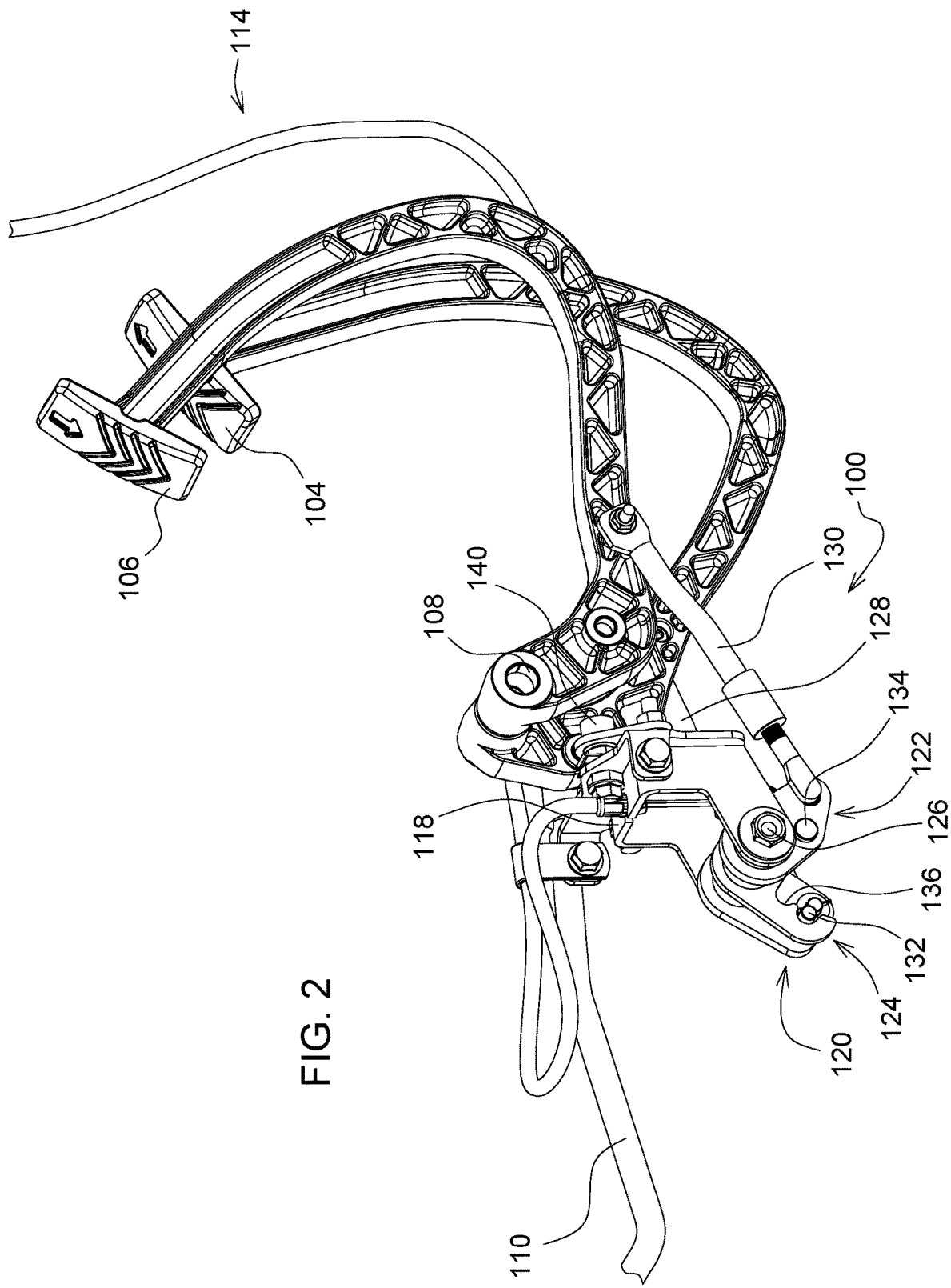
FIG. 2 is a side view of a twin pedal hydrostatic transmission with an automatic throttle according to a first embodiment of the invention.
Figure 3:
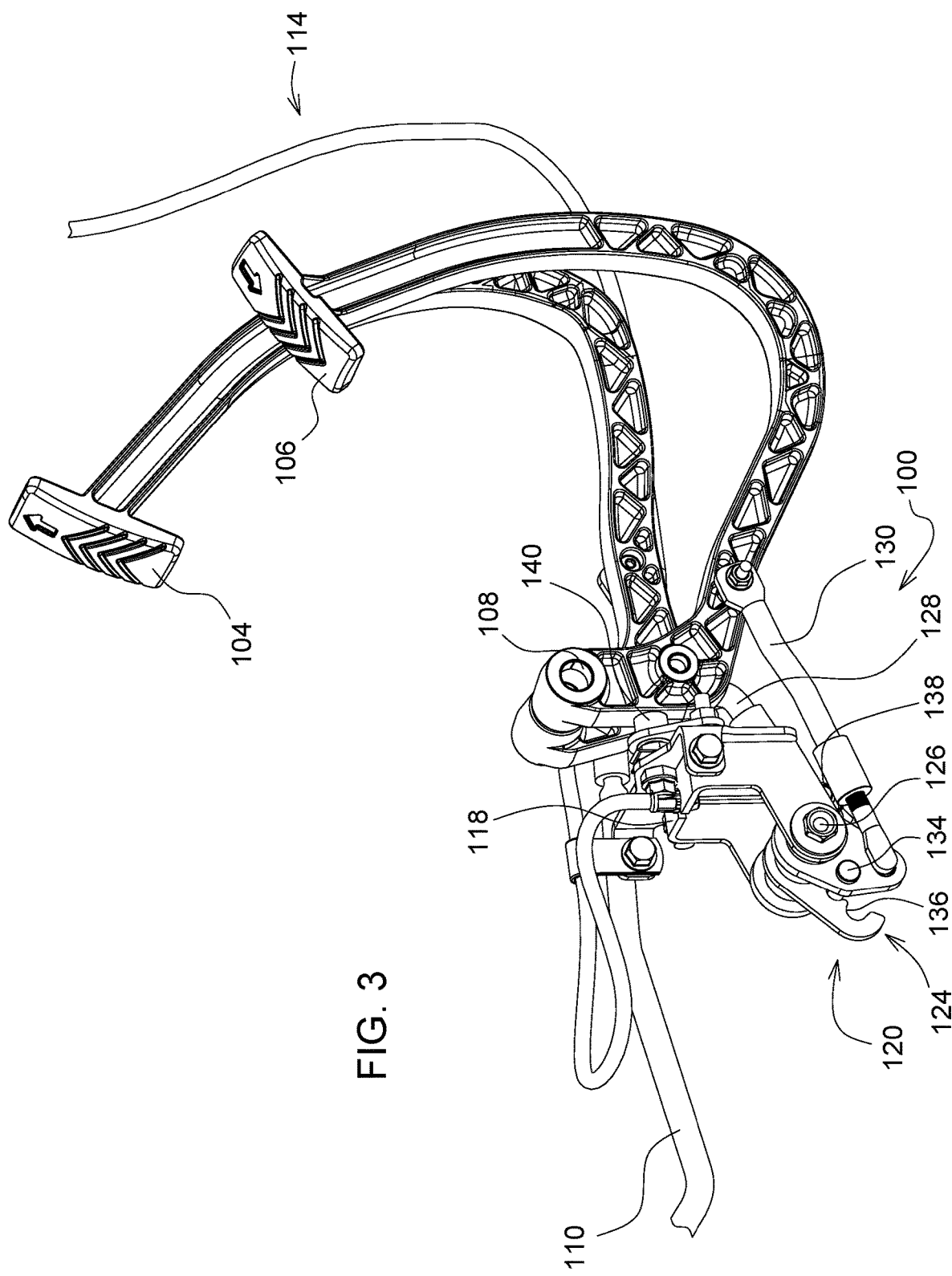
FIG. 3 is a side view of twin pedal hydrostatic transmission with an automatic throttle according to a first embodiment of the invention.
Figure 4:
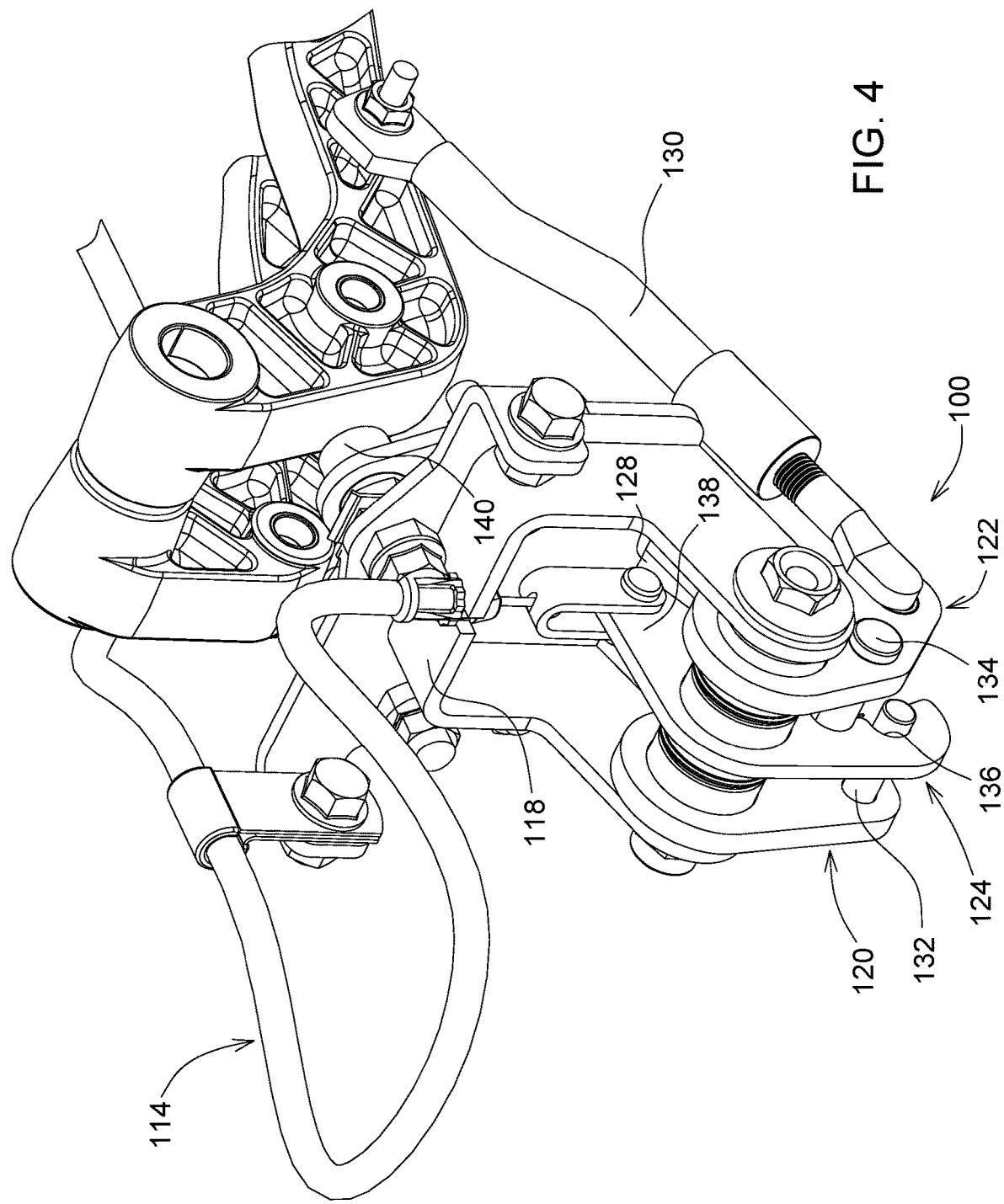
FIG. 4 is a side view of a twin pedal hydrostatic transmission with an automatic throttle according to a first embodiment of the invention.

In one embodiment of the invention shown in FIGS. 1-4, automatic throttle 100 may be provided on a tractor or utility vehicle having twin pedal hydrostatic transmission 102. The twin pedal hydrostatic transmission may include forward foot pedal 104 and reverse foot pedal 106, each of which may be independently and pivotably mounted with an arm to cross shaft 108. Each of the forward pedal and reverse pedal also may be connected by linkage 110 to trunnion or pivot on hydrostatic pump 112. Linkage 110 may move a swash plate in the hydraulic pump in a first direction in which hydraulic fluid provided to the hydraulic motors propels the vehicle forward at a desired ground speed if the forward pedal is depressed, or in the opposite direction to pivot the swash plate to move the vehicle in reverse at a desired ground speed if the reverse pedal is depressed.

In one embodiment, the automatic throttle may include a first Bowden cable 114 connecting both of the twin foot pedals to engine throttle 116. A first end of the cable's outer cover may be attached to bracket 118 mounted to the vehicle frame adjacent the twin pedals. When either of the twin foot pedals is depressed by the operator, the pedal pulls and tensions internal cable 119, and move the engine throttle in a direction to increase the engine speed.

In one embodiment, the automatic throttle may include a plurality of bell cranks 120, 122 and 124 mounted independently to the same cross shaft 126. First and second bell cranks 120 and 122 may be connected by first and second linkages or rods 128 and 130 to forward and reverse pedals 104 and 106 respectively. With the linkages or rods, the forward pedal may pivot the first bell crank, and the reverse pedal may pivot the second bell crank. A projection or pawl 132, 134 may extend from each of the first and second bell cranks in a direction parallel to the axis of cross shaft 126. When the first or second bell crank pivots, one of the projections or pawls may contact the side of first leg 136 of third bell crank 124, causing the third bell crank to pivot. Internal cable 119 may be attached to the second leg 138 of the third bell crank. By pivoting the third bell crank, internal cable 119 may be pulled or tensioned, moving the engine throttle to increase engine speed.

In one embodiment, the automatic throttle may be configured to provide different engine throttle response for each of the forward pedal and reverse pedal. For example, the maximum engine throttle position may be different for each of the forward pedal and reverse pedal. Reverse pedal stop 140 may be provided to limit the reverse pedal travel.

Alternatively, the engine throttle response rate may be varied by mounting the pawls or projections 132, 134 on each of the first and second bell cranks at different locations relative to cross shaft 126. Additionally, initial contact between the pawl and third bell crank may be made at different pedal positions for each of the forward and reverse pedals.

In one embodiment, the automatic throttle may take the place of a hand accelerator lever. Alternatively, the automatic throttle may be used in conjunction with hand accelerator lever 144 connected with a second Bowden cable 146 to engine throttle 116. For example, the operator may select engine throttle speed by moving hand accelerator lever 144 to a desired speed or RPM. As a result, the engine will start at the desired engine RPM, will increase from that desired speed when either pedal is depressed, and will return to the desired engine speed or RPM when the pedals are not depressed.

Having described the preferred embodiments, it will become apparent that various modifications can be made without departing from the scope of the invention as defined in the accompanying claims.

The invention claimed is:

1. An automatic throttle, comprising:
   a hydrostatic transmission having a forward pedal and a reverse pedal, each of the forward and reverse pedals actuating a swash plate on a hydraulic pump for forward and reverse travel respectively;
   a plurality of bell cranks pivotably mounted to a cross shaft;
   a linkage between the forward pedal and a first of the plurality of bell cranks;
   a linkage between the reverse pedal and a second of the plurality of bell cranks,
   a cable connected between a third of the plurality of bell cranks and an engine throttle;
   the third of the plurality of bell cranks pulling the cable to the engine throttle in response to depressing the forward pedal or reverse pedal to pivot either of the first or the second of the plurality of bell cranks.

2. The automatic throttle of claim 1 further comprising a respective pawl extending from each of the first and the second of the plurality of bell cranks.

3. The automatic throttle of claim 2 wherein one of the respective pawls contacts the third of the plurality of bell cranks when depressing the forward pedal or reverse pedal.

4. The automatic throttle of claim 1 wherein the third of the plurality of bell cranks has a first leg that is contacted by the first or second of the plurality of bell cranks, and a second leg connected to the cable.

5. An automatic throttle, comprising:
   a hydrostatic transmission having a forward pedal and a reverse pedal, each of the forward and reverse pedals actuating a swash plate on a hydraulic pump for forward and reverse travel;
   a first bell crank and a second bell crank connected to the forward pedal and the reverse pedal respectively; each of the first and second bell cranks pulling a Bowden cable connected to an engine throttle to increase engine speed when either of the forward or reverse pedals is depressed a third bell crank connected to the Bowden cable and pivoting on a shaft with the first and second bell cranks.

6. The automatic throttle of claim 5 further comprising a respective pawl extending from each of the first and second bell cranks and contacting the third bell crank when either of the forward or reverse pedals is depressed.

7. The automatic throttle of claim 5 further comprising a hand throttle lever connected to the engine throttle by a second Bowden cable.

8. An automatic throttle, comprising:
   a hydrostatic transmission having a forward pedal and a reverse pedal, each of the forward and reverse pedals actuating a swash plate on a hydraulic pump for forward and reverse travel respectively;
   a first cable attached to an engine throttle and is tensioned by either of the forward and reverse pedals to increase engine speed; and
   a second cable attached to the engine throttle and to a hand accelerator lever to increase engine speed;
   wherein the forward pedal is connected to a first bell crank by a first rod, and the reverse pedal is connected to a second bell crank by a second rod;
   wherein the first cable is connected to a third bell crank pivoting on a cross shaft with the first bell crank and the second bell crank.

\* \* \* \* \*